P. DAIMLER.
SPRING BUCKLE FOR SECURING SPRINGS TO AXLES.
APPLICATION FILED OCT. 25, 1906.
926,176.  Patented June 29, 1909.
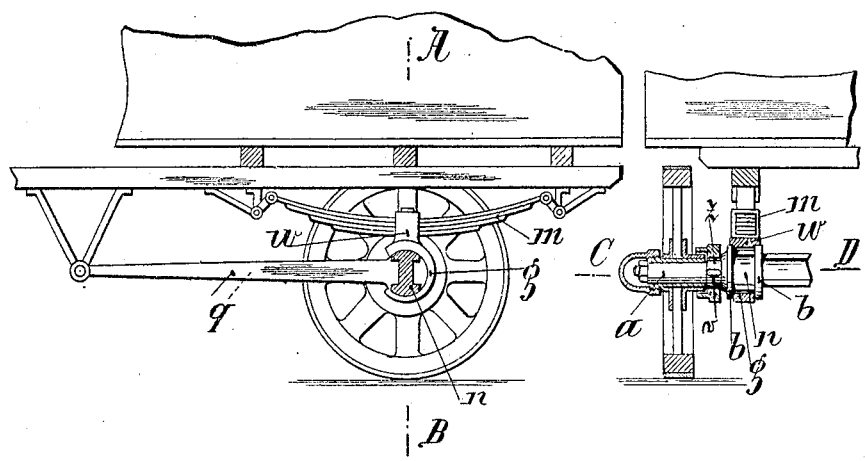
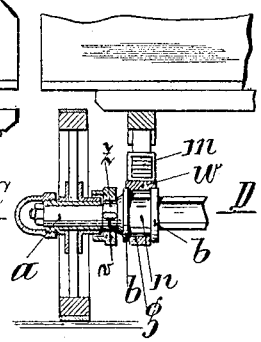
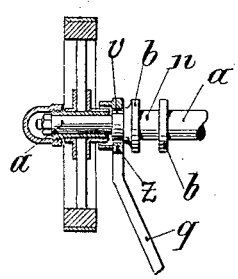
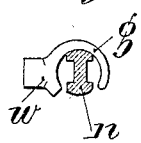
Witnesses.
Alfred Bosshardt
Stanley R. Bramall
Inventor
Paul Daimler
Per F. Eckhardt.
Attorney.

UNITED STATES PATENT OFFICE.

PAUL DAIMLER, OF UNTERTURKHEIM, GERMANY.

SPRING-BUCKLE FOR SECURING SPRINGS TO AXLES.

No. 926,176.   Specification of Letters Patent.   Patented June 29, 1909.

Application filed October 25, 1906. Serial No. 340,551.

*To all whom it may concern:*

Be it known that I, PAUL DAIMLER, citizen of Empire of Germany, residing at Unterturkheim, in the Kingdom of Würtemberg, Germany, have invented certain new and useful Improvements in Spring-Buckles for Securing Springs to Axles, of which the following is a specification, reference being had therein to the accompanying drawing.

This invention relates to improvements in that type of motor driven vehicles in which owing to the thrust beams being rigid on the wheel axle, the vehicle springs require to be fulcrumed to the axle as otherwise the respective parts would be disadvantageously stiffened and render the spring inefficient.

The object of this invention is to provide means whereby the connection between the said spring and the wheel axle is greatly simplified and rendered easier than hitherto has been the case. I attain this object by the mechanism illustrated in the accompanying drawing in which—

Figure 1 is a side view partly in section and Fig. 2 a sectional end view on line A—B of Fig. 1. Fig. 3 is a section on line C—D of Fig. 2, and Fig. 4 shows the spring buckle while being placed in position.

Similar letters refer to similar parts throughout the several views.

Referring to the figures generally, according to these improvements the part $n$ of the axle $a$ upon which the spring $m$ rests is formed according to a cylinder, flattened at opposite points and having a flange $b$ at each side. The spring buckle $w$ has a segmental ring $g$, the gap of which is of such a size as to allow of inserting the parts $n$ into the said ring.

For mounting the spring buckle $w$ the ring $g$ is placed upon the axle $a$ in the position shown in Fig. 4, in which the said gap coincides with the narrow side of the part $n$ and afterward turned 90 degrees into the position shown in Fig. 1, which brings the said gap in front of the wide side of the part $n$ in which position the ring $g$ is held secure upon the axle, but is capable of oscillating thereon together with the spring buckle $w$ and the spring $m$. The thrust beams $q, q$ are rigidly connected with the axle $a$, eyes $r$ being formed on the respective ends which receive the axle part $z$ and are secured thereto by keys $v$.

The invention described without any alterations is also applicable for springs employed upon a tubular shaft containing the driving wheel axle; in this case the part of the said tubular shaft upon which the spring rests is formed exactly like the part $n$ of the axle $a$ described.

I claim,

In a road vehicle with spring supported body, a device for connecting the spring with the wheel axle comprising a buckle secured to the spring and having a segmental ring and a cylindrical part on the wheel axle being flattened at opposite sides, the gap in the said ring permitting of inserting the said cylindrical part into the said ring when the gap of the latter is in suitable position, all combined substantially as and for the purpose set forth.

In testimony whereof I hereunto affix my signature in presence of two witnesses.

PAUL DAIMLER.

Witnesses:
 ROBERT UHLAND,
 ERNEST ENTENMANN.